United States Patent Office 3,119,845
Patented Jan. 28, 1964

3,119,845
4-CHLORO-3 SULFAMYL-BENZAMIDES
Ernst Jucker, Steinweg, Ettingen, Basel-Land, Adolf J. Lindenmann, Basel, and John Gmünder, Muttenz, Basel-Land, Switzerland, assignors to Sandoz Ltd. (also known as Sandoz A.G.), Basel, Switzerland, a Swiss firm
No Drawing. Filed Dec. 21, 1961, Ser. No. 161,286
Claims priority, application Switzerland Dec. 23, 1960
3 Claims. (Cl. 260—347.2)

The present invention relates to new sulphonamides. The new compounds correspond to the general Formula I

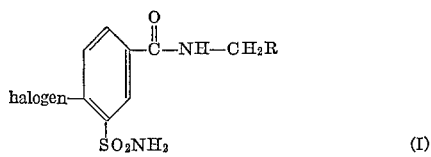
(I)

wherein R signifies a member selected from the group consisting of furyl or tetrahydrofuryl, and pharmaceutical compositions containing, in addition to an inert carrier, a compound I.

The process for the preparation of the new compounds is characterised in that a compound of general Formula II

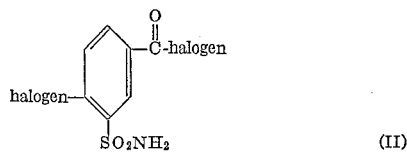
(II)

is condensed with an amine of Formula III

R—CH$_2$—NH$_2$ (III)

wherein R has the above significance, in an inert organic solvent. The presence of an agent capable of taking up hydrogen halide, e.g., a tertiary base, is preferable.

The invention may, for example, be effected as follows: A Compound II is added to a cooled solution of Compound III in chloroform containing triethylamine and stirred for a few hours at room temperature. The solvent is then distilled off, the residue taken up in ethyl acetate and washed with water. After drying over magnesium sulphate the ethyl acetate is evaporated at reduced pressure and the resulting Compound I purified in accordance with known methods.

At room temperature the Compounds I are solid and crystalline. They may be used pharmaceutically or as intermediate compounds in the production of pharmaceuticals. They may be used as either diuretics, sodium uretics or chloro uretics, some of them being capable of oral administration.

In the following non-limitative examples all temperatures are stated in degrees centigrade.

*Example 1.—3-Sulphamyl-4-Chloro-Benzoic Acid Tetrahydro-Furfurylamide*

A total of 12.7 g. of 3-sulphamyl-4-chloro-benzoic acid chloride are added portionwise in the course of 30 minutes, whilst stirring, to a solution of 5.1 g. of tetrahydrofurfurylamine and 5.1 g. of triethylamine in 250 cc. of chloroform, which solution has been cooled to —20°. The reaction mixture is kept at —20° for a further hour, then slowly heated and stirred over night at room temperature.

The solvent is distilled off at reduced pressure and the residue dissolved by the addition of 50 cc. of water containing 200 cc. of acetic ester. The aqueous layer is separated and extracted with two portions, each of 100 cc., of acetic ester. The acetic ester phases are dried over magnesium sulphate after washing with water and evaporated to a small volume in a vacuum.

The colourless, crystalline precipitate of 3-sulphamyl-4-chloro-benzoic acid tetrahydro-furfurylamide is filtered off and recrystallised from methanol for the purpose of analysis. Melting point, 169–172°.

*Example 2.—3-Sulphamyl-4-Chlorobenzoic Acid Furfurylamide*

A total of 12.7 g. of 3-sulphamyl-4-chlorobenzoic acid are added portionwise, whilst stirring, in the course of 30 minutes to a solution of 4.9 g. of furfurylamine and 5.1 g. of triethylamine in 250 cc. of chloroform, which solution has been cooled to —20°. The reaction mixture is kept at —20° for a further hour, then slowly heated to room temperature and stirred over night at this temperature.

The solvent is evaporated off at reduced pressure and the residue brought to dissolve by the addition of 50 cc. of water containing 100 cc. of acetic ester. The aqueous layer is extracted with two portions, each of 100 cc., of acetic ester and the acetic ester phases dried over magnesium sulphate after washing with water and evaporated in a vacuum. After recrystallisation from ethanol/water the residue yields crystalline 3-sulphamyl-4-chlorobenzoic acid furfurylamide.

For the purpose of analysis it is recrystallised from methanol. Melting point, 150–152°.

Having thus disclosed the invention what is claimed is:
1. A sulphonamide of the formula

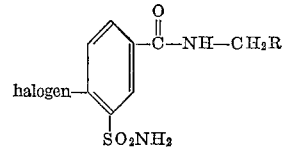

wherein halogen is chloro and R signifies a member selected from the group consisting of furyl and tetrahydrofuryl.
2. 3-sulfamyl-4-chloro-N tetrahydrofurfuryl benzamide.
3. 3-sulfamyl-4-chloro-N furfuryl benzamide.

References Cited in the file of this patent

Henne et al.: J. Amer. Chem. Soc., volume 58 (1936), page 882, QD 1. A5.

Simons: Fluorine Chemistry, volume 1 (1950), page 402, QD 181. F1.